(12) United States Patent
Suganuma et al.

(10) Patent No.: US 7,349,479 B2
(45) Date of Patent: Mar. 25, 2008

(54) COMMUNICATIONS SYSTEM OF TWO-WIRE LINE ENHANCING FAIL-SAFE PERFORMANCE

(75) Inventors: Takeshi Suganuma, Kariya (JP); Yoshimitsu Fujii, Okazaki (JP)

(73) Assignee: Denso Corporation, Kariya (JP)

( * ) Notice: Subject to any disclaimer, the term of this patent is extended or adjusted under 35 U.S.C. 154(b) by 717 days.

(21) Appl. No.: 10/385,563

(22) Filed: Mar. 12, 2003

(65) Prior Publication Data

US 2003/0194015 A1     Oct. 16, 2003

(30) Foreign Application Priority Data

Apr. 10, 2002   (JP)   ............... 2002-107792

(51) Int. Cl.
  *H04B 3/00*   (2006.01)
  *H04L 25/00*   (2006.01)
(52) U.S. Cl. .............. 375/257; 398/1; 398/4; 398/10; 398/17; 702/58; 702/59; 714/1; 714/2; 714/3; 714/4; 714/25; 714/43; 714/100
(58) Field of Classification Search ........ 375/257; 714/4, 25, 43, 100, 1–3; 398/1–24; 702/58, 702/59
  See application file for complete search history.

(56) References Cited

U.S. PATENT DOCUMENTS

| 4,723,241 A | 2/1988 | Grobel et al. |
| 5,357,518 A | 10/1994 | Peter |
| 5,572,658 A * | 11/1996 | Mohr et al. ............ 714/4 |
| 5,696,777 A | 12/1997 | Hofsaess |
| 5,765,031 A * | 6/1998 | Mimuth et al. .......... 714/43 |
| 6,115,831 A * | 9/2000 | Hanf et al. ............ 714/43 |
| 6,816,074 B2* | 11/2004 | Wong ................. 340/569 |

FOREIGN PATENT DOCUMENTS

| EP | 1069733 A2 * | 1/2001 |
| JP | 61-173399 | 8/1986 |
| JP | 3-113551 | 11/1991 |
| JP | 9-162909 | 6/1997 |
| JP | 10-79752 | 3/1998 |
| JP | 2000-165415 | 6/2000 |

OTHER PUBLICATIONS

European Search Report-Aug. 31, 2005.
JPO Examination Report dated Aug. 2006.

* cited by examiner

*Primary Examiner*—Curtis Odom
(74) *Attorney, Agent, or Firm*—Nixon & Vanderhye P.C.

(57) ABSTRACT

Five electronic control units (ECU) control vehicle devices using CAN protocol. Each of ECUs is provided with a resistor and a switch for activating the resistor. A first and fifth ECUs are arranged on the leftmost and rightmost ends. Resistors of the first and fifth ECUs are used as terminating resistors to a two-wire communications line. When the two-wire communications line is broken, the first ECU sends a test signal while other ECUs excluding the fifth ECU turn on the switches from right to left. When the test signal can be received, a broken point is located on the right side of ECU that turns on its switch at this time. Thereafter ECUs on the left side of the broken point conduct communication.

12 Claims, 7 Drawing Sheets

HIGH ← NECESSITY WHEN RUNNING FOR EVACUATION → LOW

| SIGNAL \ ECU NAME | ENGINE ECU | TRANSMISSION ECU | ABS/TCS ECU | INSTRUMENT CLUSTER ECU | CRUISE ECU |
|---|---|---|---|---|---|
| ENGINE SPEED | SEND (EVERY 4ms) | RECEIVE | | RECEIVE | RECEIVE |
| VEHICLE SPEED | SEND (EVERY 4ms) | RECEIVE | | RECEIVE | |
| WATER TEMPERATURE | SEND (EVERY 32ms) | RECEIVE | | RECEIVE | |
| ACCELERATOR OPENING | SEND (EVERY 4ms) | RECEIVE | | | RECEIVE |
| SHIFT POSITION | RECEIVE | SEND (EVERY 8ms) | RECEIVE | RECEIVE | |
| ABS OPERATION | RECEIVE | RECEIVE | SEND (EVERY 4ms) | RECEIVE | RECEIVE |
| TCS OPERATION | RECEIVE | | SEND (EVERY 4ms) | RECEIVE | RECEIVE |
| AIR-CONDITIONER SWITCH | RECEIVE | | | SEND (EVERY 32ms) | |
| CRUISE SWITCH | RECEIVE | | | | SEND (EVERY 16ms) |

COMMUNICATIONS SYSTEM OF TWO-WIRE LINE ENHANCING FAIL-SAFE PERFORMANCE

CROSS REFERENCE TO RELATED APPLICATIONS

This application is based on and incorporates herein by reference Japanese Patent Application No. 2002-107792 filed on Apr. 10, 2002.

FIELD OF THE INVENTION

The present invention relates to a communications system in which a plurality of communications devices conduct communication via a two-wire communications line having terminating resistors connected to both ends thereof. In particular, the communications system is provided with a fail-safe performance.

BACKGROUND OF THE INVENTION

A CAN (Controller Area Network) has been conventionally used, for example, as a communication protocol of a LAN (local area network) in an automobile.

Here, an outline of the CAN will be described by the use of FIG. 7. In this respect, in FIG. 7 and the following description based on FIG. 7, it is assumed that each communications device conducting communication in accordance with the CAN protocol is one of a plurality of (=n) electronic control units (hereinafter referred to as ECU) 101 for controlling the respective parts of an automobile. Moreover, in the following description, in a case of particularly differentiating the ECUs 101 from each other, they are referred to as ECU (1), ECU (2), ECU (3), . . . , and ECU (n) from the ECU 101 on the extreme left to the right in FIG. 7.

Figure 7:
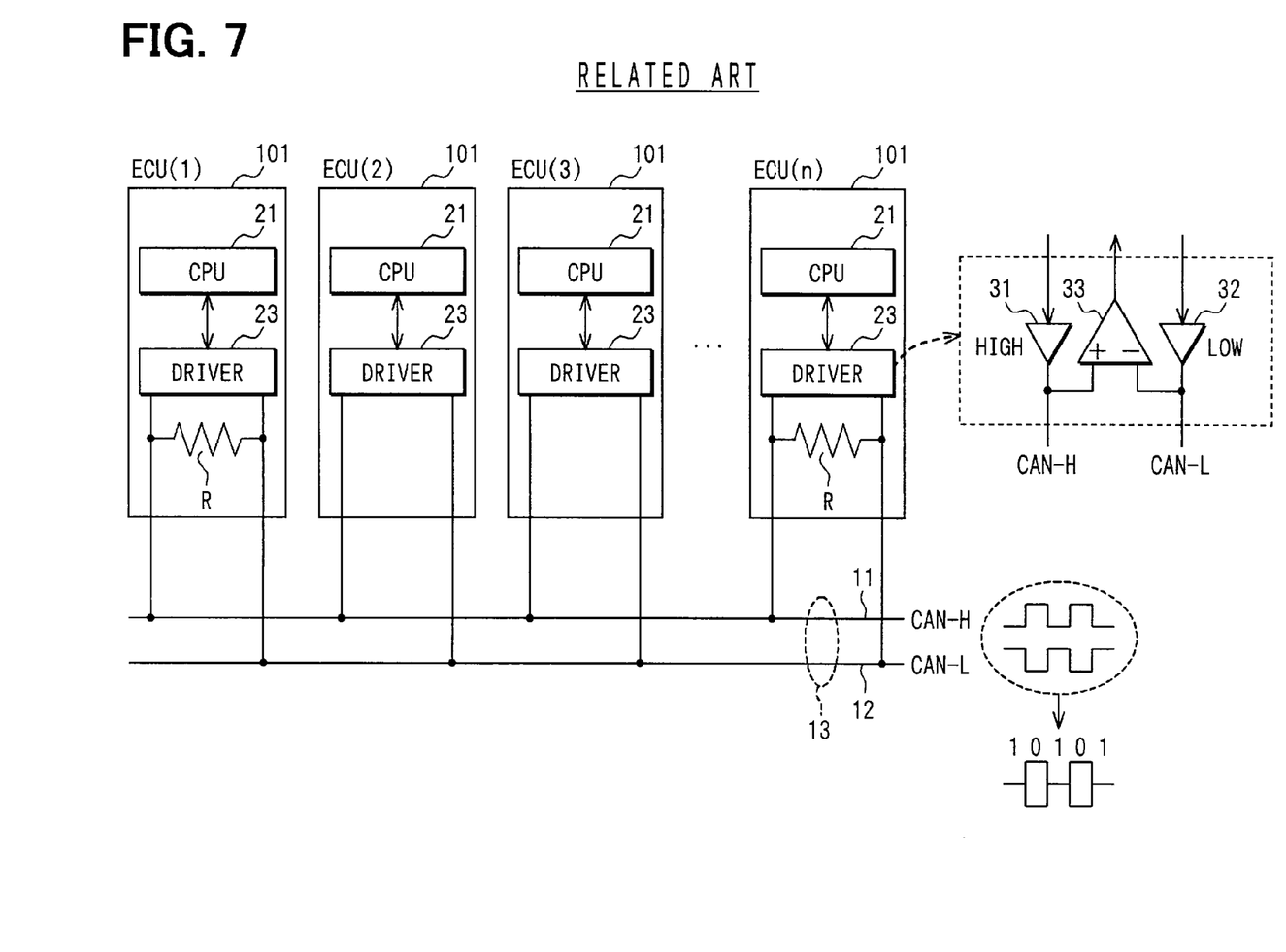
FIG. 7 is a configurational diagram showing a CAN and a communications line in accordance with the CAN.

As shown in FIG. 7, in the CAN, a two-wire communications line 13 including a CAN-H line (hereinafter simply referred to as "H line") 11 and a CAN-L line (hereinafter simply referred to as "L line") 12 is used as a communications line (so-called communications bus) and terminating resistors R are connected to both ends of the two-wire communications line 13. Here, the resistance of the terminating resistor R is 120 Ω, for example. Moreover, in the embodiment shown in FIG. 7, the terminating resistors R are provided in the two ECU (1) and ECU (n) arranged on the ends of the two-wire communications line 13, respectively.

Then, in the CAN, the communications device (ECU 101) for sending data sends an inverse signal to the H line 11 and the L line 12, and the communications device for receiving the data determines whether data on the communications line 13 is "1" or "0" from a difference in voltage between the H line 11 and the L line 12. As a specific configurational example, each ECU 101 is provided with a CPU 21 and a communications driver 23. The CPU 21 executes a control processing for controlling the respective parts of the automobile and a processing for conducting communication with the other ECUs 101. The communications driver 23 is connected to the foregoing two-wire communications line 13 and outputs data given and sent by the CPU 21 to the two-wire communications line 13 and inputs data on the two-wire communications line 13 to the CPU 21. Then, the communications driver 23 is provided with an output buffer 31, an output buffer 32, and a binarization circuit 33. The output buffer 31 makes the voltage of the H line 11 a high level (for example, 5 V) when the data to be sent is "0," and makes the voltage of the H line 11 a low level (for example, 2.5 V) when the data to be sent is "1." The output buffer 32 makes the voltage of the L line 12 a low level (for example, 0 V) when the data to be sent is "0" and makes the voltage of the L line 12 a high level (for example, 2.5 V) when the data to be sent is "1." The binarization circuit 33 has the voltage of the H line 11 and the voltage of the L line inputted thereto to generate a binary signal of "1" or "0" expressing data (in turn, data to be received) on the communications line from the difference between both the voltages. Further, if the two-wire communications line 13 is normal in this CAN, the respective ECUs 101 can conduct communication at as high a communication speed as 500 kbps, for example.

Still further, in a case where a failure (break failure, or short-circuit failure) occurs in the H line 11 or the L line 12, each ECU 101 can conduct communication, even though at a communication speed (for example, 125 kbps) lower than the high communication speed of 500 kbps described above, by the use of only the normal line (H line 11 or L line 12). In other words, even when either the H line 11 or the L line 12 breaks down, each ECU 101 can conduct communication. In this case, however, each ECU 101 uses only one of the H line 11 and the L line 12 and thus is susceptible to noises, fluctuations in signal level, and the like, whereby the communication speed is limited to a low value.

By the way, in the communications system shown in FIG. 7 in accordance with the forgoing CAN, it is assumed that the respective ECUs 101 send or receive data among them through the high-speed communication of 500 kbps to control the respective parts of the automobile.

In this case, when a break failure occurs at any point in the two-wire communications line 13 (for example, between ECU (1) and ECU (3)), there is brought about a state in which the two-wire communications line 13 is not provided with terminating resistors R. Thus, this makes it impossible for all the ECUs 101 to conduct communication at an intrinsic communication speed (that is, the foregoing high-speed communication of 500 kbps under normal operating conditions) and hence to properly conduct a processing to be executed (control of the automobile, in this example).

In this respect, for example, JP-A No. 165415/2000 discloses the following technique. All ECUs to be connected to a CAN bus (two-wire communications line of CAN) are previously provided with resistors that can be terminating resistors. The foregoing resistors of the ECUs arranged at the ends of the CAN bus are connected as the terminating resistors to the CAN bus by switches or the like. Here, wherever the ECU is connected to the CAN bus, it is possible to circumvent the need of mounting or dismounting the terminating resistor on or from the ECU or modifying the ECU. However, this technique disclosed in this publication of patent application can not produce a fail-safe effect in a case where a break failure occurs in the CAN bus and hence can not solve the foregoing problem.

SUMMARY OF THE INVENTION

It is an object of the present invention to enhance fail-safe performance for a break failure of a two-wire communications line in a communications system that is required to have terminating resistors connected to both ends. A plurality of communications devices conduct communication via the two-wire communications system.

To achieve the foregoing object, a communications system where a plurality of communications devices conduct communication via a two-wire communications line having terminating resistors connected to both its ends is provided with the following.

A standby resistor that can be a terminating resistor is provided to correspond to all or a part of the communications devices. Further, when a break failure occurs in the two-wire communications line, a failed point of the two-wire communications line is located and the standby resistor corresponding to a given communications device arranged near the failed point is connected as the terminating resistor to the two-wire communications line. The part of the communications devices including the given communications device and the communications devices arranged opposite to the failed point when viewed from the given communications device are enabled to conduct communication. Even if the break failure occurs at any point in the two-wire communications line, the foregoing part of the communications devices can conduct communication in the same manner as under normal operating conditions. Thus, this can improve fail-safe performance for the break failure in the two-wire communications line.

In one embodiment of the present invention, when one of the two communications lines constituting the two-wire communications line breaks down, the plurality of communications devices connected to the two-wire communications line can conduct communication at a lower speed than communication at a high speed under normal operating conditions by utilizing only the other communications line.

Thereby it is possible to select making the part of the communications devices conduct the communication at the high speed or making all the communications devices conduct communication even at the lower speed in accordance with the failed point of the two-wire communications line. Therefore, it is possible to perform a suitable fail-safe operation according to the failed point of the two-wire communications line.

Furthermore, it is preferable that the communications devices required to conduct communication so as to make the automobile run for evacuation be arranged nearer to one end of the two-wire communications line.

This is because in a case where the two-wire communications line is broken, this can reduce the possibility that the broken point becomes a point where it is impossible to make the devices essential to running for evacuation conduct the communication at the high speed. In other words, this can raise the possibility that it is possible to make the communications devices essential to running for evacuation conduct the communication at the high speed.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

An embodiment to which the present invention is applied will be hereinafter described by the use of the drawings.

Figure 1:
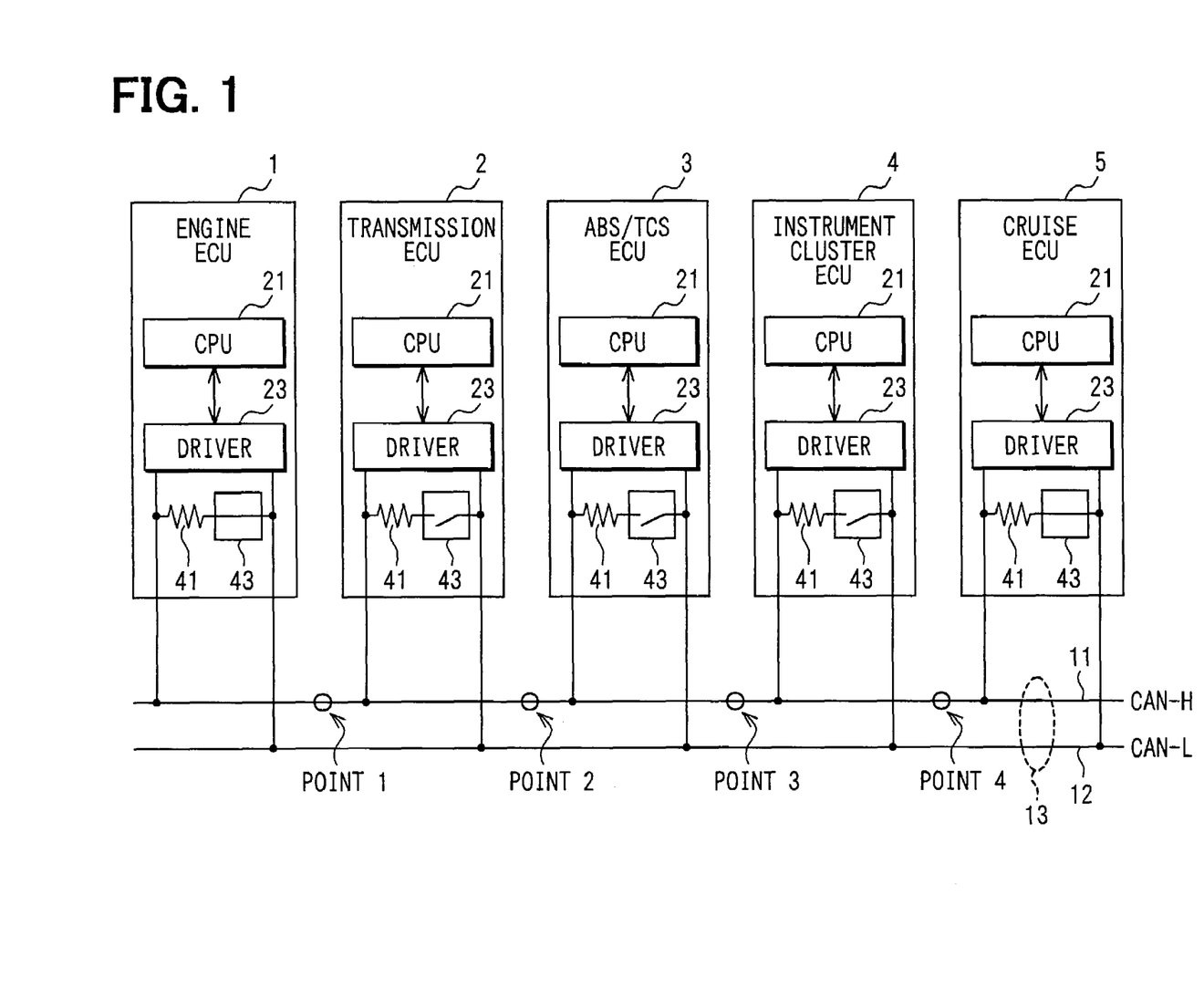
FIG. 1 is a configurational diagram showing a communications system of an embodiment of the present invention.

First, FIG. 1 is a configurational diagram showing a communications system of the embodiment. Here, the same constituent elements shown in FIG. 1 as shown in FIG. 7 are denoted by the same reference symbols and their detailed descriptions will be omitted. Moreover, in the following description, expressions relating to a left-right direction such as left end and right end means the left-right direction in FIG. 1

As shown in FIG. 1, in the communications system of the present embodiment, a plurality of (five, in the present embodiment) ECUs (electronic control unit corresponding to communications device) 1 to 5 are for controlling the respective parts of an automobile. The ECUs 1 to 5 conduct data communication with each other in accordance with a CAN protocol to control objects which are allotted to the respective ECUs and are to be controlled.

Here, the ECUs 1 to 5 are connected to a two-wire communications line 13 including a H line 11 and a L line 12, and each of all the ECUs 1 to 5 is provided with not only a CPU 21 and a communications driver 23 but also a resistor 41 and a switch 43. The resistor 41 can be a terminating resistor of the two-wire communications line 13 and has a resistance of 120 Ω. The switch 43 is turned on to connect the resistor 41 as a terminating resistor to a two-wire communications line 13 (to be specific, between the H line 11 and the L line 12). In this respect, the switch 43 is made of a semiconductor device such as a transistor and is turned on or off by a command from the CPU 21.

Then, when the communications system of the present embodiment is in a usual (or normal) state where no abnormality occurs in the two-wire communications line 13, the switches 43 of two ECUs 1 and 5, of the five ECUs 1 to 5, arranged on both ends of the two-wire communications line 13 are turned on. Here, the resistors 41 of the respective ECUs 1 and 5 arranged on both ends are used as the actual terminating resistors of the two-wire communications line 13. In this respect, in the following description, to turn on the switch 43 of any one of the ECUs to connect the resistor 41 of the ECU as a terminating resistor to the two-wire communications line 13 is expressed as "to turn on a terminating resistor 41" or "the terminating resistor is on."

Further, in the present embodiment, the ECUs 1 to 5 are arranged in the order of descending necessity in running for evacuation (limp form running) of the automobile from the left end of the two-wire communications line 13. The ECU 1 arranged at the left end of the two-wire communications line 13 is the ECU for controlling an engine (hereinafter referred to as "engine ECU"). Then, the ECU 2 arranged next to (on the right of) the ECU 1 is the ECU for controlling a transmission ("transmission ECU") and the ECU 3 arranged next to (on the right of) the ECU 2 is the ECU for performing an antilock brake control and a traction control ("ABS/TCS-ECU"). Further, the ECU 4 arranged next to (on the right of) the ECU 3 is the ECU for controlling an instrument cluster in which various meters are arranged ("instrument cluster ECU"). The ECU 5 arranged at the right end of the two-wire communications line 13 is the ECU (cruise ECU) for performing a cruise control to run the automobile at a constant speed or at a constant distance between the automobiles.

Figure 2:
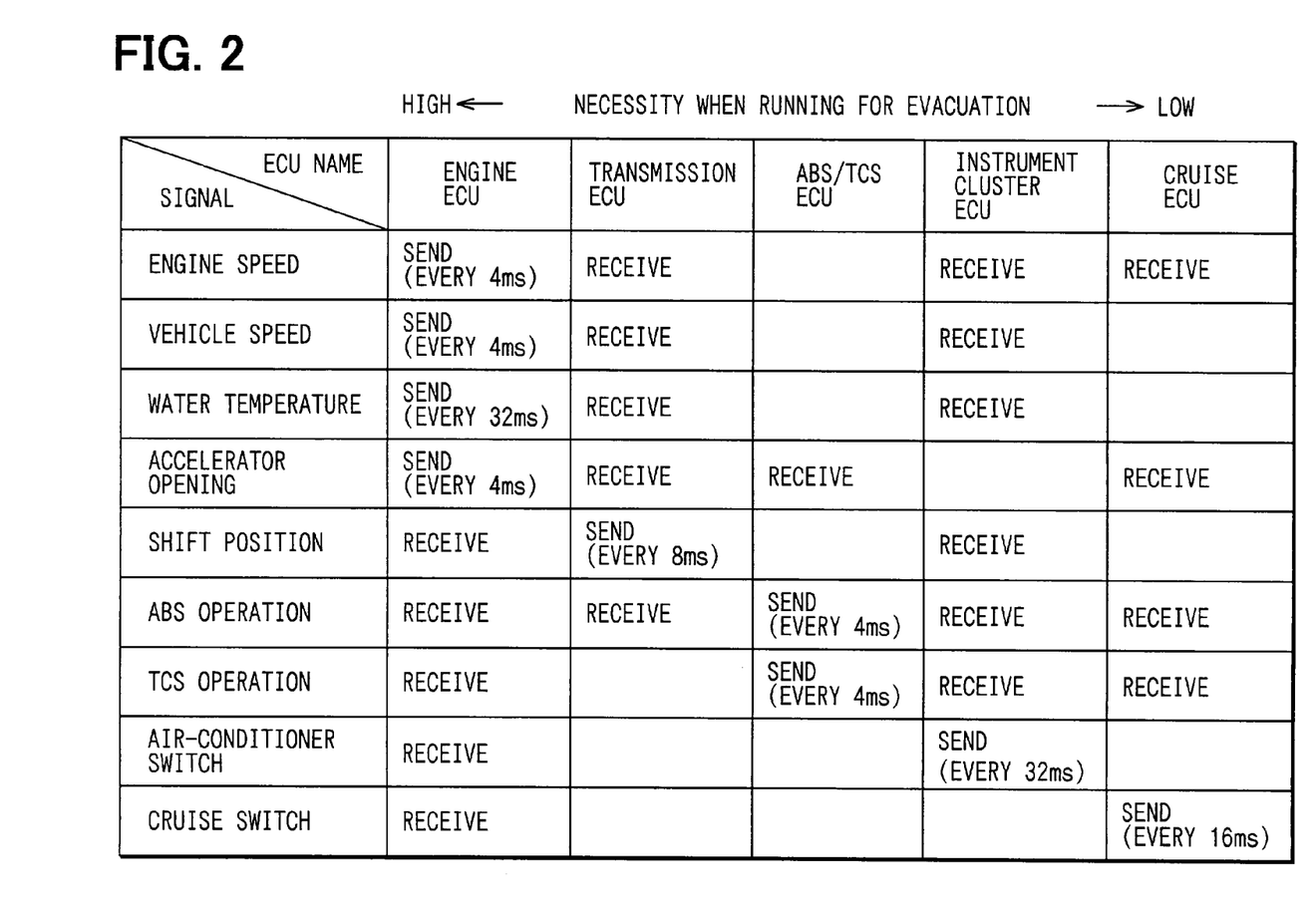
FIG. 2 is a table showing kinds of information exchanged between respective ECUs and sending timings of the information.

Then, the respective ECUs 1 to 5 usually send or receive information by means of high-speed communication (communication at a communication speed of 500 kbps in the present embodiment) in accordance with the CAN protocol, as shown in FIG. 2. For example, the engine ECU 1 sends the data of an engine speed every 4 ms and the transmission ECU 2, the instrument cluster ECU 4, and the cruise ECU 5 receive the data of the engine speed and use it for their control processings. Moreover, for example, the transmission ECU 2 sends the data of a shift position every 8 ms and the engine ECU 1 and the instrument cluster ECU 4 receive the data of the shift position and use it for their control processings.

In the communications system of the present embodiment like this, the ECUs 1 to 5 communicate with each other at regular time intervals and thus when the two-wire communications line 13 breaks down, the data can not be normally sent or received. As a result, all the ECUs 1 to 5 recognize a communication abnormality almost at the same time.

Then, in the present embodiment, in a case where a break failure occurs in the two-wire communications line 13 (to be more specific, in a case where the H line 11 or the L line 12 is broken), generally, a failed point (in this case, a broken point) is located by the procedures (1) to (4) described below and a part of ECUs of the ECUs 1 to 5 keep high-speed communication between them. In this respect, in the following description, as shown in FIG. 1, it is assumed that, of the respective points of the two-wire communications line 13, a point between the ECU 1 and the ECU 2 is a "point 1," a point between the ECU 2 and the ECU 3 is a "point 2," a point between the ECU 3 and the ECU 4 is a "point 3," and a point between the ECU 4 and the ECU 5 is a "point 4."

(1) The ECU 1 connected to the left end of the two-wire communications line 13 recognizes a communication abnormality, the ECU 1 waits for a predetermined time period At during which all the ECUs are considered to surely recognize the communication abnormality. It then starts sending a test signal at the same communication speed as during normal operation.

(2) The respective ECUs 2, 3, and 4 connected to the two-wire communications line 13 at the points except the both ends thereof recognize the communication abnormality. They then turn on their terminating resistors 41 (to be more specific, turn on the switches 43 to connect the resistors 41 as the terminating resistors 41 to the two-wire communications line 13) in the order of the ECUs arranged far away from the ECU 1 (that is, in the order of ECU 4 → ECU 3 → ECU 2).

(3) Here, it is assumed that a break occurs, for example, at the point 3 of the points 1 to 4 of the two-wire communications line 13 shown in FIG. 1. Here, the ECU 2 and the ECU 1 are arranged on the side opposite to the point 3 when viewed from the ECU 3. When the terminating resistor 41 of the ECU 3 is turned on, three ECUs 1 to 3 can conduct high-speed communication, and the ECU 2 and the ECU 3 can receive the test signal from the ECU 1 by means of the high-speed communication.

Therefore, if each of the ECUs 2, 3, and 4 can receive the test signal from the ECU 1 when it turns on its own terminating resistor 41, it sends a notice of broken point which shows that the two-wire communications line 13 has a break between itself and the ECU arranged on the right next to itself.

(4) The ECU 1 is informed of the broken point of the two-wire communications line 13 by the notice of broken point sent from any one of the ECUs 2, 3, and 4. When the automobile can run for evacuation at that point even if communication is stopped between the ECUs sandwiching the broken point, the ECU 1 sends a notice of thereafter restarting communication at the same high communication speed as under normal operating conditions to the other ECUs. Here, the other ECUs are arranged from the ECU 1 to the broken point (that is, the other ECUs arranged on the left side from the broken point). Thereafter, only the part of the ECUs arranged from the left end of the two-wire communications line 13 to the broken point conduct the high-speed communication among them. Moreover, in this case, the part of the ECUs perform control processings by using a value of information stored in each ECUs . instead of a value of information that the ECUs are supposed to receive from the other ECUs arranged on the right side of the broken point (that is, ECUs brought into a state where they can not conduct communication). The value of the information stored in each ECUs is a default value or backup value before the two-wire communications line 13 breaks down.

By contrast, when the automobile can not run for evacuation if communication is stopped between the ECUs sandwiching the broken points, the ECU 1 sends a notice of conducting low-speed communication by mean of a single wire (to be more specific, which is low-speed communication conducted by the use of a normal line among the H line 11 and the L line 12 and at a speed of 125 kbps in the present embodiment) to the other ECUs. All the ECUs 1 to 5 thereafter conduct the low-speed communication by the use of the normal line among the H line 11 and the L line 12. Further, there is a case when the notice of broken point is not sent to the ECU 1 from any one of the ECUs 2, 3, and 4, all of the ECUs 2, 3, and 4, all of which are supposed to turn on their terminating resistors 41. In this case the ECU 1 determines that the communications line breaks down at the point 1 or that the two-wire communications line 13 is short-circuited (to be more specific, either the H line 11 or the L line 12 is short-circuited to some potential). Then, also in this case, the ECU 1 sends a notice of conducting the low-speed communication by means of the single wire to the other ECUs and thereafter all the ECUs 1 to 5 conduct the low-speed communication by the use of the normal line among the H line 11 and the L line 12.

Next, in order to realize the foregoing operations (1) to (4), the contents of processings performed by the CPU 21 of the ECU 1 and the respective CPUs 21 of the ECUs 2 to 4 will be described by the use of flow charts shown in FIG. 3 and FIG. 4.

Figure 3:
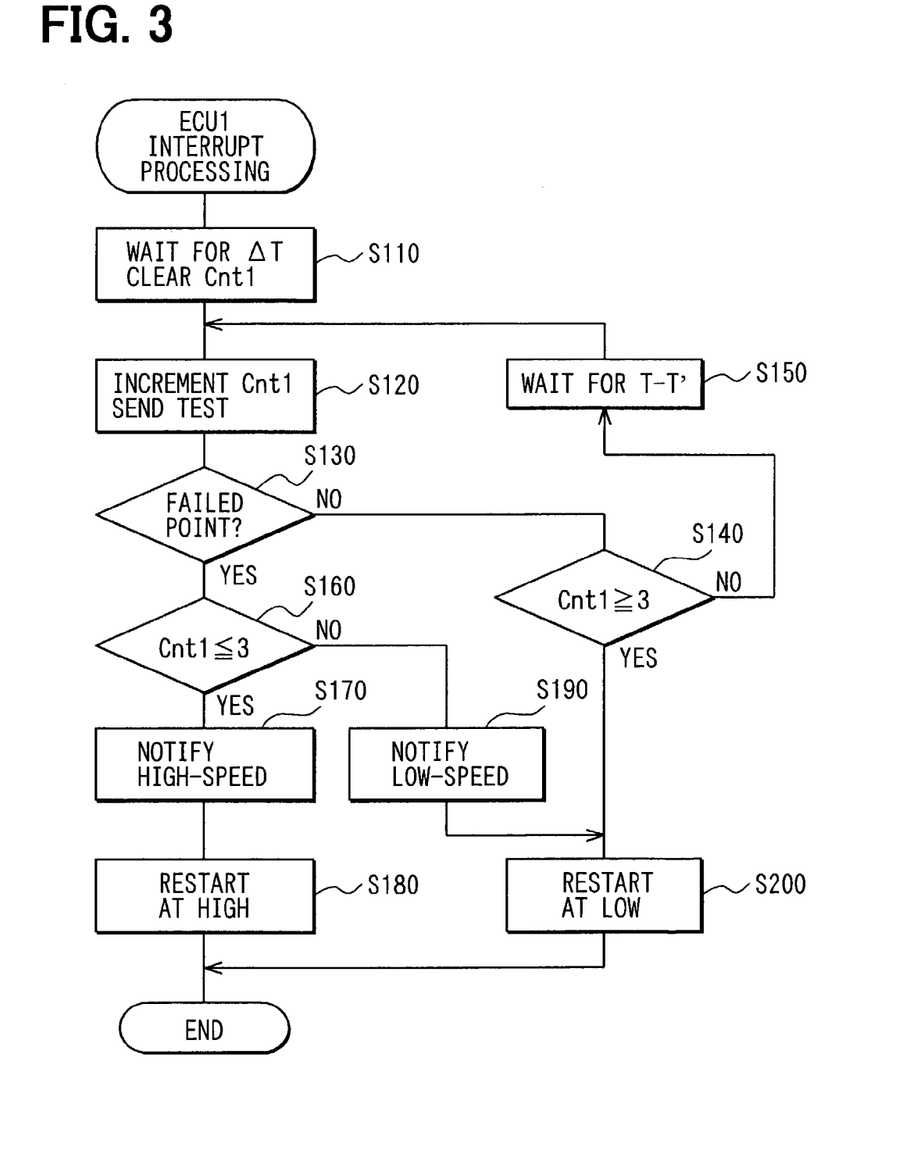
FIG. 3 is a flow chart showing the contents of an interrupt processing at the time of communication abnormality executed by the CPU of an ECU 1 connected to the left end of a two-wire communications line.

Here, FIG. 3 shows the contents of an interrupt processing at the time of communication abnormality that the CPU 21 of the ECU 1 performs when it can not receive data which is supposed to be sent from the other ECUs at regular time intervals thereby to detect the occurrence of the communication abnormality. Similarly, FIG. 4 shows the contents of an interrupt processing at the time of communication abnormality that the CPUs 21 of the ECUs 2, 3, and 4 perform when they can not receive data which is supposed to be sent from the other ECUs at regular time intervals thereby to detect the occurrence of the communication abnormality, but FIG. 4 actually shows the contents for the ECU 3. The contents of the processings performed by the CPUs 21 of the ECUs 2, 4 are partially different from those of the ECU 3, so the difference between them will be described every time the contents of the processings performed by the CPU 21 of the ECU 3 will be described based on FIG. 4. Moreover, the CPUs 21 of the respective ECUs 1 to 4 find which ECU's terminating resistor 41 is on at the present by means of the value of counter Cnt N, which will be described later (where N after Cnt is any one of 1 to 4, for example, Cnt 1 for the CPU 21 of the ECU 1, and Cnt 3 for the CPU 21 of the ECU 3). Then, in the present embodiment, when the value of the Cnt N is 1, the terminating resistor 41 of the ECU 4 is turned on and when the value of the Cnt N is 2, the terminating resistor 41 of the ECU 3 is turned on, and when the value of the Cnt N is 3, the terminating resistor 41 of the ECU 2 is turned on.

First, as shown in FIG. 3, when the CPU 21 of the ECU 1 detects the communication abnormality and starts performing an interrupt processing at the time of communication abnormality, the CPU 21 waits at Step 110 for the predetermined time period At during which all the ECUs are considered to surely recognize the communication abnormality and then clears the counter Cnt N (which is Cnt 1 because the ECU 1 is here described) to 0.

Next, at Step 120, the counter Cnt 1 is incremented by 1 and a test signal is sent to the other ECUs at the same communication speed (=500 kbps) as under normal operating conditions. Then, it is determined at the next Step 130 whether or not the notice of broken point described in the foregoing procedure (3) is sent from any one of the ECUs 2, 3, and 4. If the notice of broken point is not sent (in other words, the notice of broken point can not be received), the program proceeds to Step 140 where it is determined whether the value of the counter Cnt 1 is 3 or more.

If it is determined at this Step 140 that the counter Cnt 1 is not 3 or more (is less than 3), it is determined that the broken point of the two-wire communications line 13 is now being located and the program proceeds to Step 150 and waits at Step 150 until the next test signal is sent and returns to Step 120 where the counter Cnt 1 is incremented by 1 and the test signal is again sent.

Here, it is determined at Step 140 whether the broken point of the two-wire communications line 13 is being located or whether high-speed communication can not be restarted even if all the terminating resistors 41 of the ECUs 4, 3, and 2 are turned on. Then, the numeral of "3" used for determination at this Step 140 is the one in a case where the number of the ECUs connected to the two-wire communications line 13 is 5, and for example, if the total number of the ECUs is 6, the numeral used for determination at Step 140 is "4." Moreover, in the present embodiment, each of the ECUs 2, 3, and 4 turns on the terminating resistor 41 for a predetermined time T. The ECU 1 sends the test signal every the predetermined time T and thus assuming that a time period during which the test signal is sent (a time period required to send the test signal) is T'. The waiting time at the foregoing Step 150 thereby becomes "T-T'" (see FIG. 5 and FIG. 6).

On the other hand, if it is determined at the foregoing Step 130 that the notice of broken point is sent from any one of the ECUs 2, 3, and 4, the program proceeds to Step 160. Here, it is determined whether or not the value of the counter Cnt 1 is 3 or less. By determining it, it is determined that only the ECUs arranged on the left side of the broken point should conduct the same high-speed communication as under normal operating conditions or that all the ECUs 1 to 5 should conduct the low-speed communication by means of a single wire. In this respect, at this Step 160, if the value of the counter Cnt 1 is 3 or less, it is determined that only the ECUs arranged on the left side of the broken point should conduct the high-speed communication.

Here, the meaning of the numeral of "3" used for determination at Step 160 will be described. First, in the present embodiment, when the ECU 1 and the ECU 2 are brought into a state where they can not conduct communication, the automobile can not run for evacuation. In other words, in the present embodiment, the ECU 1 and the ECU 2 corresponds to the above-mentioned devices essential to running for evacuation.

Then, if the value of the counter Cnt 1 is, for example, 3 at the time of determination at Step 160, it means that a break occurs at the point 2 in the two-wire communications line 13 and the ECU 1 and the ECU 2 can conduct the high-speed communication by turning on the terminating resistor 41 of the ECU 2. Moreover, even in a case where the value of the counter Cnt 1 is 1 or 2, that is, a break occurs at the point 4 or the point 3, the ECU 1 and the ECU 2 can conduct the high-speed communication by turning on the terminating resistor 41 of the ECU 4 or the ECU 3.

Thus, at Step 160, it is determined that if the value of the counter Cnt 1 is 3 or less, the broken point of the two-wire communications line 13 is the point where it is possible to make the ECUs 1 and 2 as the devices essential to running for evacuation conduct the high-speed communication between them. It is thereby determined that only the ECUs arranged on the left side of the broken point should conduct the high-speed communication.

In this respect, if the ECUs as the devices essential to running for evacuation are three ECUs 1 to 3 (ECU 1, ECU 2, and ECU 3), the value used for determination at Step 160 is "2." Then, at Step 160 in this case, if the value of the counter Cnt 1 is 2 or less, it is determined that the broken point of the two-wire communications line 13 is the point 3 or the point 4. In this case, the ECUs 1 to 3 as the devices essential to running for evacuation can conduct the high-speed communication among them. It is thereby determined that only the ECUs arranged on the left side of the broken point should conduct the high-speed communication. In the other words, if the value of the counter Cnt 1 is not 2 or less (is 3 or more), it is determined that the broken point of the two-wire communications line 13 is the point (the point 1 or the point 2). In this case, it is impossible to make the ECUs 1 to 3 as the devices essential to running for evacuation conduct the high-speed communication among them. In order to ensure capability of running for evacuation, it is determined that all the ECUs 1 to 5 should conduct communication even at a low communication speed (that is, low-speed communication by means of the single wire).

Next, in a case where it is determined at the foregoing Step 160 that only the ECUs arranged on the left side of the broken point should conduct the high-speed communication, the program proceeds to Step 170. Here a notice of directing the high-speed communication (high-speed communication directing notice) is sent to the other ECUs capable of conducting the high-speed communication (that is, the ECUs arranged from the ECU 1 to the broken point). At the following Step 180, the ECU 1 restarts communicating with the other ECUs at high speed. Then, the ECU 1 finishes performing the interrupt processing at the time of communication abnormality and thereafter only the part of the ECUs arranged from the left end to the broken point of the two-wire communications line 13, of the five ECUs 1 to 5, conduct the same high-speed communication as under normal operating conditions.

Further, in a case where it is determined at the foregoing Step 160 that all the ECUs should conduct the low-speed communication by means of the single wire, the program proceeds to Step 190. Here a notice of directing low-speed communication by means of the single wire (low-speed communication directing notice) is sent to the other ECUs capable of conducting the high-speed communication and then the program proceeds to Step 200. In this respect, the low-speed communication directing notice at Step 190 is not sent to the ECUs incapable of conducting the high-speed communication (that is, the ECUs arranged on the right side of the broken point) or not received even if it is sent. However, in the present embodiment, the ECUs incapable of conducting the high-speed communication automatically conduct the low-speed communication by means of the single wire. To be more specific, if the ECUs incapable of conducting the high-speed communication are the ECUs 2, 3, and 4, the ECUs conduct the low-speed communication by means of the single wire in the processing of Step 330 which will be described later. The program proceeds to Step 330 from Step 270 in FIG. 4, and when the CPU 21 of the ECU 5 detects the occurrence of the communication abnormality, it switches a communication operating mode to the low-speed communication by means of the single wire.

On the other hand, in a case where it is determined at the foregoing Step 140 that the value of the counter Cnt 1 is 3 or more, it means that even if all the terminating resistors 41 of the ECUs 4, 3, and 2 are turned on, the ECUs 4, 3, and 2 can not restart the high speed communication. For this reason, it is determined that the two-wire communications line 13 is broken or short-circuited at the point 1 and also in this case, the program proceeds to Step 200.

At Step 200 to which the program proceeds from the foregoing Step 190 or Step 140, the ECU 1 restarts communicating with the other ECUs at low speed and switches inner settings to start a communication failure control. This is the end of the interrupt processing at the time of communication abnormality performed by the ECU 1 and thereafter all the ECUs 1 to 5 conduct the low-speed communication by means of the single wire.

Incidentally, in a case where the other ECUs 2 to 5 also conduct the low-speed communication, the ECUs perform a communication failure control. Here, the communication failure control means a control for reducing the number of times for sending data or the number of data to be sent. For example, in a case of the ECU 1, the data to be sent originally every 4 ms (engine speed or vehicle speed) is sent every 8 ms thereby to reduce the number of times for sending the data, and in a case of the ECU 5, sending the data of cruise switch is stopped to reduce the number of the data sent out to the communication line.

Figure 4:
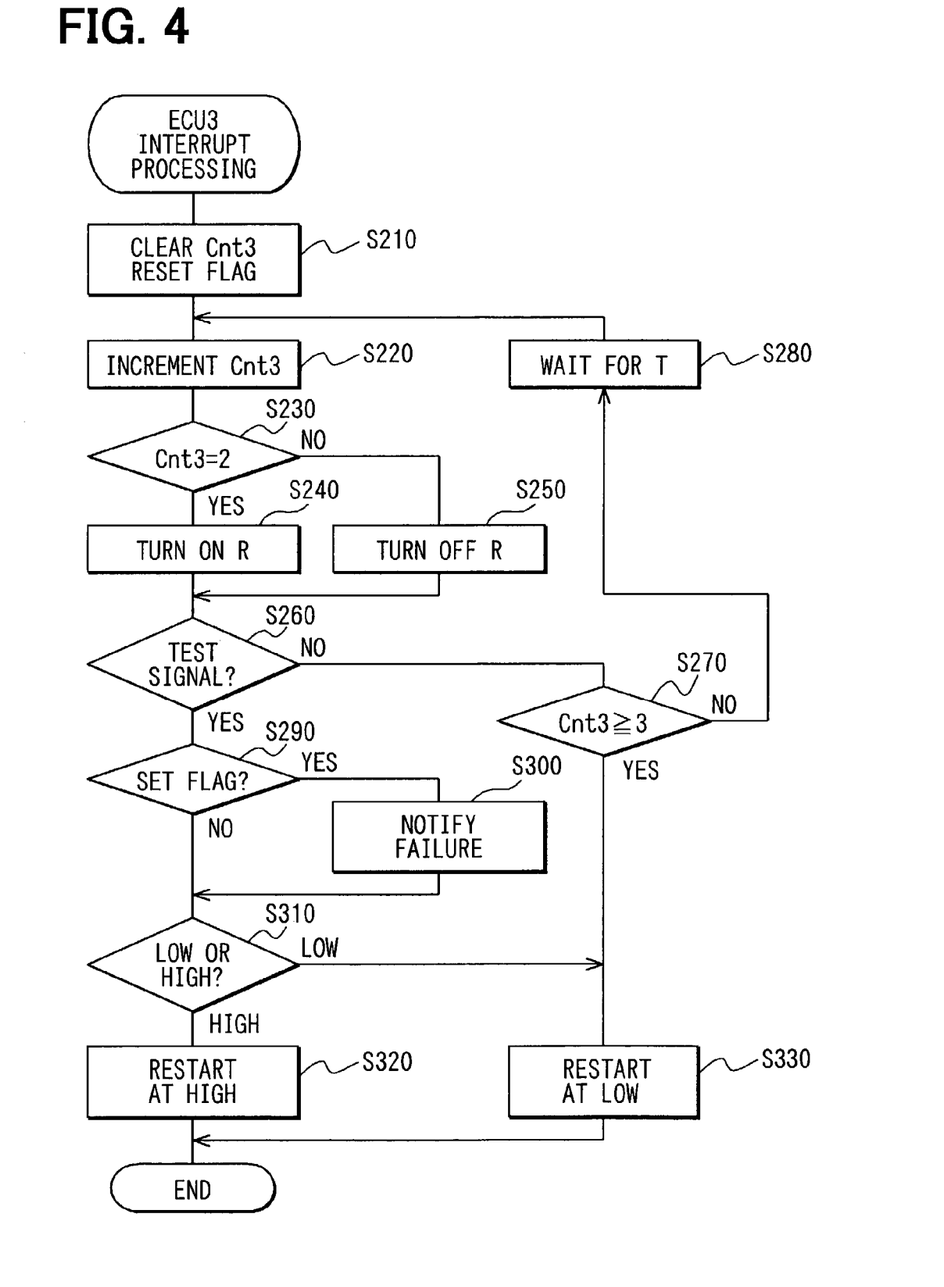
FIG. 4 is a flow chart showing the contents of an interrupt processing at the time of communication abnormality executed by the CPU of an ECU 3 connected third from the left end of the two-wire communications line.

Next, as shown in FIG. 4, when the CPU 21 of the ECU 3 detects the communication abnormality and starts executing the interrupt processing at the time of communication abnormality, first, at Step 210, it clears the counter Cnt N (Cnt 3, because the ECU 3 has been here described) to 0 and resets a terminal flag. Here, the terminal flag is a flag set when the ECU keeps its terminating resistor 41 turned on.

Then, at the next Step 220, the counter Cnt 3 is incremented by 1 and at the following Step 230, it is determined whether or not the value of the counter Cnt 3 is 2 which is allotted to the ECU 3.

Here, if the value of the counter Cnt 3 is 2 (Step 230: YES), the program proceeds to Step 240 where the terminating resistor 41 is turned on and the terminal flag is set. Further, if the value of the counter Cnt 3 is not 2 (Step 230: NO), the program proceeds to Step 250 where the terminating resistor 41 is turned off (that is, the switch 43 is turned off to bring the resistor 41 into a state where it is out of the two-wire communication line 13) and the terminal flag is reset.

In other words, it is determined at Step 230 based on the value of the counter Cnt 3 whether or not it is my turn to turn on the terminating resistor 41. Then, the value used for determination at Step 230 is "2" for the ECU 3, but is "1" for the ECU 4 because the ECU 4 is required to first turn on the terminating resistor 41 and is "3" for the ECU 2 because the ECU 2 is required to third turn on the terminating resistor 41.

Next, after executing the processing of the foregoing Step 240 or Step 250, the program proceeds to Step 260 where it is determined whether or not the test signal sent from the ECU 1 at Step 120 in FIG. 3 can be received. Then, in a case where the test signal can not be received (Step 260: NO), the program proceeds to Step 270 where it is determined whether or not the value of the counter Cnt 3 is 3 or more. If it is determined that the value of the counter Cnt 3 is not 3 or more (is less than 3), it is determined that such a state develops that the terminating resistor 41 of the next ECU is required to be turned on and the program proceeds to Step 280. Then, at this Step 280, the program waits for the predetermined time T and then returns to Step 220 where the counter Cnt 3 is incremented by 1 to execute the processings following Step 230 again.

Here, at Step 270, as is the case with Step 140 in FIG. 3, it is determined whether the broken point of the two-wire communications line 13 is being located or not. Then, the value "3" used for determination at this Step 270 becomes "4" when the total number of the ECUs is 6, and "5" when the total number of the ECUs is 7.

On the other hand, in a case where it is determined at the foregoing Step 260 that the test signal can be received from the ECU 1, the program proceeds to Step 290 where it is determined whether the terminal flag is set or not. If the terminal flag is not set (Step 290: NO), it means that the ECUs arranged on the right side of the ECU 3 turn on their terminating resistors 41 and thus are enabled to conduct the high-speed communication with the ECU 1 thereby to receive the test signal. The program thereby proceeds to Step 310 without performing any processing.

In contrast, if the terminal flag is set (Step 290: YES), it means that the ECU 3 turns on its terminating resistor 41 and thus is enabled to conduct the high-speed communication with the ECU 1 thereby to receive the test signal. The program thereby proceeds to Step 300 where the ECU 3 sends the ECU 1 a notice of broken point showing that the two-wire communications line 13 is broken between the ECU 3 and the ECU right adjacent to the ECU 3 and then proceeds to Step 310.

Here, the description of the ECU 3 has been given, so that at Step 300, the ECU 3 sends a notice of broken point showing that the two-wire communications line 13 is broken at the point 3. In a case of the ECU 4, the ECU 4 sends a notice of broken point showing that the two-wire communications line 13 is broken at the point 4. In a case of the ECU 2, the ECU 2 sends a notice of broken point showing that the two-wire communications line 13 is broken at the point 2.

Further, when a processing of Step 300 is executed by the ECU 3, the ECU 2 arranged on the left side of the ECU 3 can receive the test signal from the ECU 1 but does not turn on its terminating resistor 41, so that the program proceeds in the manner of Step 260: YES → Step 290: NO → Step 310 and hence the ECU 2 does not send the notice of broken point. In other words, in this case, the ECU 2 remains silent because it does not directly find at which point the two-wire communications line 13 is broken.

Next, at Step 310, it is determined whether the notice sent from the ECU 1 at Step 170 or Step 190 in FIG. 3 is a high-speed communication directing notice or a low-speed communication directing notice.

Here, in a case where the notice sent from the ECU 1 is the high-speed communication directing notice, the program proceeds to Step 320 where the ECU 3 restarts communicating with the other ECUs at high speed. Then, this is the end of the interrupt processing at communication abnormality for the ECU 3 (or ECU 2, ECU 4) and thereafter only the part of the ECUs arranged between the left end and the broken point of the two-wire communications line 13 conduct the same high-speed communication as under normal operating conditions.

On the other hand, in a case where it is determined at the foregoing Step 310 that the notice sent from the ECU 1 is the low-speed communication directing notice, the program proceeds to Step 330. Then, at this Step 330, the ECU 3 restarts communicating with the other ECUs at low speed and switches the inner setting so as to start the communication failure control. Further, if the terminating resistor 41 is ON, the ON state is cancelled to separate the terminating resistor 41 from the two-wire communications line 13.

This is the end of the interrupt processing at communication abnormality performed by the ECU 3 (or ECU 2 or ECU 4) and thereafter all the ECUs 1 to 5 conduct the low-speed communication by means of the single wire, and the respective ECUs 1 to 5 perform the communication failure control for reducing the number of times for sending the data or the number of the data to be sent.

Further, in a case where it is determined at the foregoing Step 270 that the value of the counter Cnt 3 is 3 or more, it means that the ECU 3 is arranged on the right side of the broken point (that is, the break occurs on the left side of the ECU 3). Otherwise, it means that even when all the terminating resistors 41 of the ECUs 4, 3, and 2 are turned on, the high-speed communication can not be restarted (that is, the two-wire communications line 13 is broken at the point 1 or short-circuited). In this case, the program also proceeds to Step 330.

Therefore, in a case where the processing of Step 200 in FIG. 3 is executed in the ECU 1, all the ECUs 1 to 5 conduct the low-speed communication by means of the single wire while performing the communication failure control.

Figure 5:
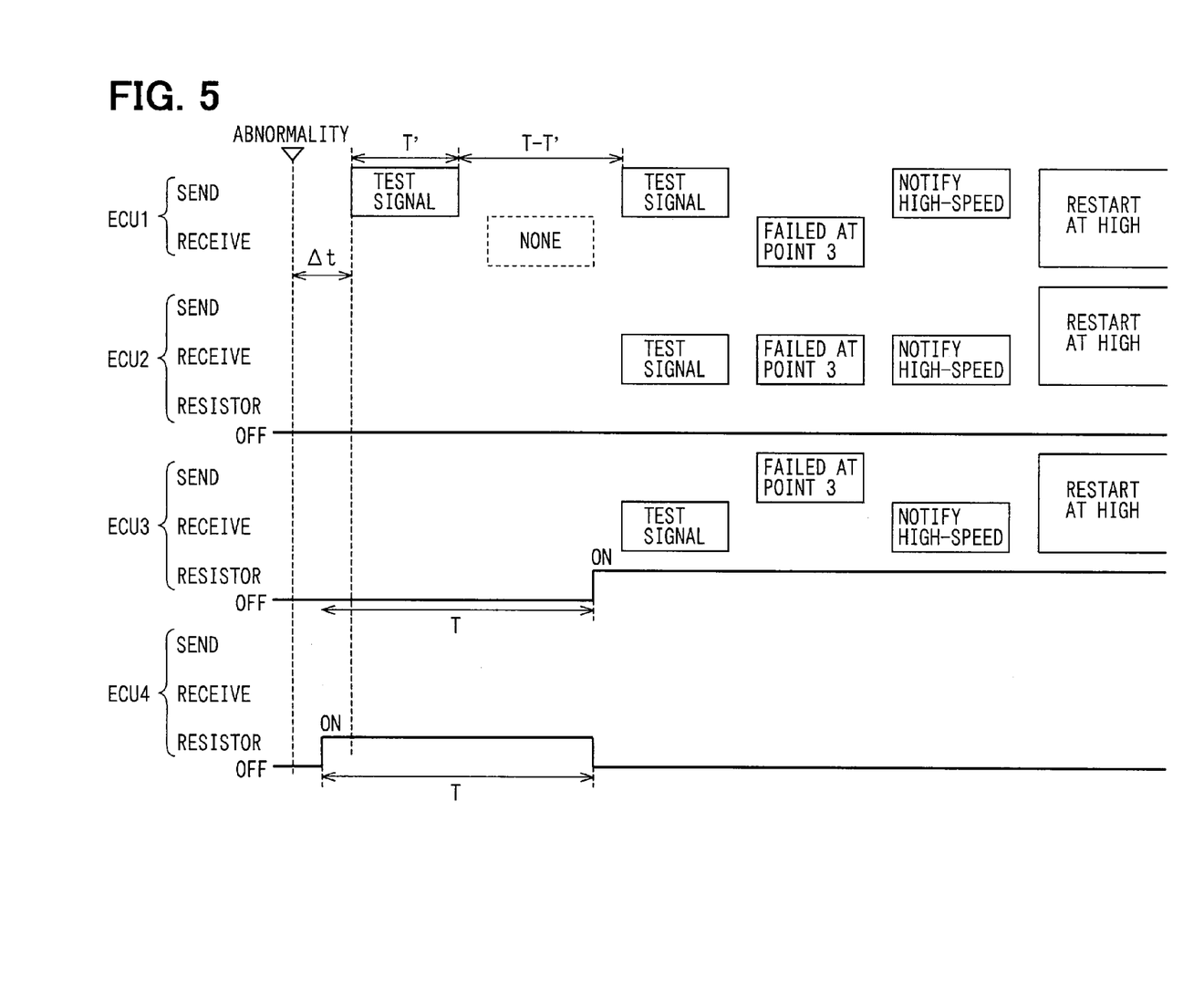
FIG. 5 is a time chart showing an action in a case where the two-wire communications line is broken at a point 3 in FIG. 1.

In the communications system of the present embodiment described above, for example, in a case where the a break failure occurs at the point 3 of the two-wire communications line 13 in FIG. 3, as shown in FIG. 5, the ECUs 1, 2, and 3 continue to conduct the high-speed communication. Here, the terminating resistor 41 of the ECU 3 is on (that is, in a state where the resistor 41 of the ECU 3 functions as the terminating resistor of the two-wire communications line 13).

In other words, when the broken failure occurs in the two-wire communication line 13, of the ECUs 2 to 4, the ECU 4 first turns on the terminating resistor 41 by the processing of Step 240 and the ECU 1 sends the test signal by the processing of Step 120. In a case where the broken point is the point 3, however, turning on the terminating resistor 41 by the ECU 4 is not effective and thus, at this timing, no ECU that is capable of conducting the high-speed communication with the ECU 1 is found (that is, the ECU is capable of receiving the test signal).

Then, when the predetermined time T elapses, the ECU 3 next turns on the terminating resistor 41 by the processing of Step 240 and the ECU 1 sends the test signal again by the processing of Step 120. Then, in this case, turning on the terminating resistor 41 by the ECU 3 is effective and at this timing the ECU 3 and the ECU 2 can thereby conduct the high-speed communication with the ECU 1 and receive the second test signal from the ECU 1.

Then, since the ECU 3 turns on its terminating resistor 41, it sends the notice of broken point showing that the two-wire communications line 13 is broken at the point 3 to the ECU 1. In this respect, at this time, the ECU 2 can receive the test signal from the ECU 1, as described above, but it does not turn on its terminating resistor 41 and thus it does not directly find at which point the two-wire communications line 13 is broken, so it remains silent.

Further, the ECU 1 receives the notice of broken point from the ECU 3 and finds that the broken point is the point 3. It then determines by the processing at Step 160 whether only the ECUs arranged on the left side of the broken point should conduct the high-speed communication or all the ECUs should conduct the low-speed communication by means of the single wire.

Then, since the broken point is on the right side of the ECU 2 in this case, the ECU 1 determines that the high-speed communication should be conducted (Step 160: YES) and sends the high-speed communication directing notice by the processing of Step 170.

Then, thereafter, the ECU 1 executes the processing of Step 180 and the ECUs 2, 3 executes the processing of Step 320. As a result, only the ECUs 1 to 3 arranged on the left side of the point 3 of the broken point (in other words, the ECU 3 in which the terminating resistor 41 is in the ON state and the other ECUs 2, 1 arranged opposite to the broken point when viewed from the ECU 3) conduct the same high-speed communication as under normal operating conditions.

Figure 6:
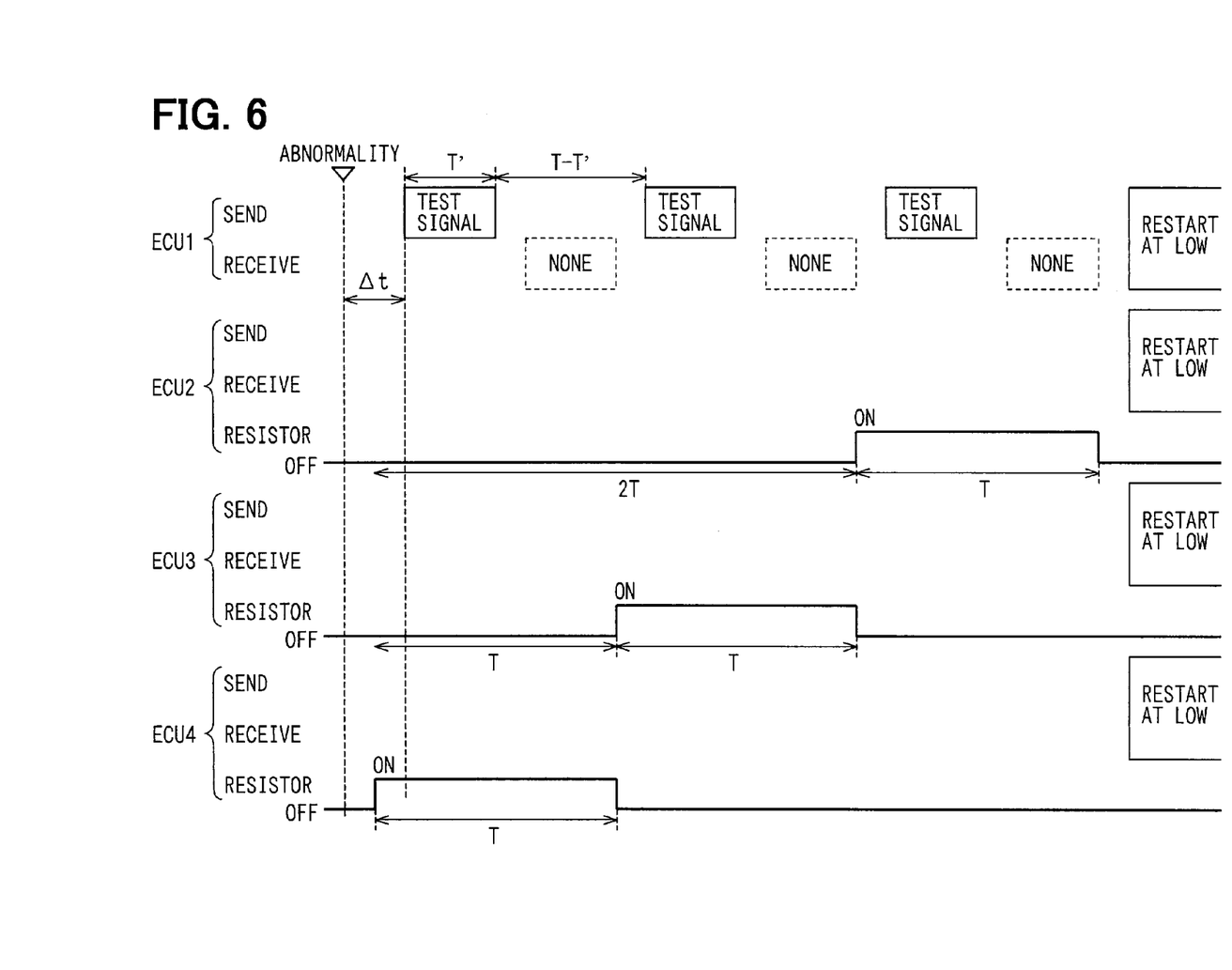
FIG. 6 is a time chart showing an action in a case where the two-wire communications line is broken at a point 1 in FIG. 1.

On the other hand, in the communications system of the present embodiment, for example, in a case where the two-wire communications line 13 is broken at the point 1 in FIG. 1, as shown in FIG. 6, all the ECUs 1 to 5 conduct the low-speed communication by means of the single wire in a state where the terminating resistors 41 of the ECUs 2 to 4 are not in the ON state. Here, in FIG. 6, the illustration of the ECU 5 is omitted.

That is, in this case, even if any one of the ECUs 2 to 4 turns on its terminating resistor 41, no ECU that is capable of conducting the high-speed communication with the ECU 1 is found. For this reason, even if the ECU 1 sends the test signal many times, it can not receive the notice of broken point from the other ECUs. When a time of about "3×T" elapses from the occurrence of the break failure, the ECU 1 starts conducting the low-speed communication by means of the single wire by the processing of Step 200 to which the program proceeds from Step 140.

Further, each of the ECUs 2 to 4 can not receive the test signal from the ECU 1 without end. When the time of about "3×T" elapses from the occurrence of the break failure, each of them thereby starts conducting the low-speed communication by means of the single wire by the processing of Step 330 to which the program proceeds from Step 270. Still further, at the time when the occurrence of communication abnormality is detected, the ECU 5 is switched to a state where it conducts the low-speed communication by means of the single wire.

Therefore, when the time of about "3×T" elapses from the occurrence of the break failure, all the ECUs 1 to 5 conduct the low-speed communication by means of the single wire. In this respect, also in a case where the H line 11 or the L line 12 is short-circuited, after the operations shown in FIG. 6, all the ECUs 1 to 5 conduct the low-speed communication by means of the single wire.

Further, as described above, in a case where the value used for determination at Step 160 in FIG. 3 is set at "2," (that is, in a case where the ECUs required to conduct communication to make the automobile run for evacuation are the ECUs 1, 2, and 3), even when the two-wire communications line 13 is broken at the point 2, all the ECUs 1 to 5 conduct the low-speed communication by means of the single wire. This ensures minimum performance in running for evacuation.

This is because in other words, in this case, the ECU 1 receives from the ECU 2 the notice of broken point showing that the two-wire communications line 13 is broken at the point 2. At this time, since the value of the counter Cnt 1 is 3, the processing is executed in the ECU 1 in the order of Step 160: NO → Step 190 → Step 200 in FIG. 3. By contrast, in the ECU 2, the processing is executed in the order of Step 310: low speed → Step 330 in FIG. 4, and in the ECUs 3 and 4, the processing is executed in the order of Step 270: YES → Step 330 in FIG. 4.

According to the communications system of the present embodiment described above, even if the break failure occurs in the two-wire communications line 13, the broken point can be located and the ECUs arranged on the side nearer to the ECU 1. from the broken point can conduct the same high-speed communication as under normal operating conditions between them. Therefore, this can improve fail-safe performance for the break failure of the two-wire communications line 13.

Further, in the communications system of the present embodiment, according to the broken point located, the high-speed communication by part of the ECUs or the low-speed communication by all the ECUs is selected. In particular, suppose a case where the broken point is the point where it is impossible to make the ECUs as the devices essential to running for evacuation, which are required to conduct communication so as to make the automobile run for evacuation, conduct the high-speed communication. For example, if the devices essential to running for evacuation are the ECUs 1 and 2, the broken point is the point 1 and if the devices essential to running for evacuation are the ECUs 1 to 3, the broken points are the point 1 and the point 2. In the case, all the ECUs 1 to 5 are made to conduct the low-speed communication by means of the single wire, so that it is possible to perform a suitable fail-safe operation according to the broken point and to ensure the minimum performance in running for evacuation.

Then, further, in the present embodiment, the ECUs 1 and 2 as the devices essential to running for evacuation are arranged nearer to the one side of the two-wire communications line 13. Thereby in a case where the two-wire communications line 13 is broken, the important ECUs 1 and 2 are enabled to conduct the same high-speed communication as under normal operating conditions. It is possible to increase the possibility of performing a sufficient control of running for evacuation.

On the other hand, in the communications system of the present embodiment, in a case where all the ECUs 1 to 5 conduct the low-speed communication, any one of the ECUs reduces the number of times for sending the or the number of the data to be sent. Thus, it is possible to readily avoid the communications line being brought into a busy state.

Further, in the communications system of the present embodiment, the part of the ECUs, which are made to continue conducting the high-speed communication by turning on the terminating resistor 41 of any one of the ECUs 2 to 4, perform the control processing by using the value of the information stored thereof instead of the value of the information, which are supposed to be receive from the other ECUs brought into a state incapable of conducting communication. The stored value of the information is the default value or the backup value. Thus, it is possible to perform the control processing in a state as close to the state under normal operating conditions as possible.

While one embodiment of the present invention has been described up to this point, it is needless to say that the present invention may be modified into various embodiments.

For example, in the foregoing embodiment, in the processing (FIG. 3) at Step 160 executed by the ECU 1, the broken point of the two-wire communications line 13 is determined by the value of the counter Cnt 1, but it is also recommended that the broken point be determined by the notice of broken point from the other ECUs.

Further, while the resistors 41 of the two ECUs 1 and 5 arranged on both ends of the two-wire communications line 13 are connected as the inherent terminating resistors to the two-wire communications line 13, it is also recommended that both or one of the inherent terminating resistors be arranged outside the ECUs.

Then, for example, in FIG. 1, in a case where one of the inherent terminating resistors is arranged at the end of the two-wire communications line 13 on the right of the ECU 5, it is recommended that the switch 43 of the ECU 5 be normally off and that also the ECU 5 performs the foregoing same processing as the ECUs 2 to 4. This processing, in a case where the break failure occurs in the two-wire communications line 13, allows the terminating resistors 41 to be turned on in the order of ECU 5 → ECU 4 → ECU 3 → ECU 2. Then, as is the case with the above-mentioned embodiment, at the time when any one of the ECUs comes to be capable of receiving the test signal from the ECU 1, it is determined that the broken point is adjacent to (on the right side of) the ECU which turns on its terminating resistor 41 at the time and between the ECU and another ECU earlier turning on its terminating resistor 41.

Further, in the foregoing embodiment, in a case where the two-wire communications line 13 is broken, the ECUs arranged from the ECU arranged just on the left side of the broken point located to the ECU 1 conduct the high-speed communication. However, it is also recommended that, for example, the ECUs from the ECU arranged second toward the ECU 1 from the broken point located to the ECU 1 conduct the high-speed communication. However, the foregoing embodiment can make more ECUs conduct the high-speed communication and thus can produce a larger effect.

What is claimed is:

1. A communications system comprising:
   a two-wire communications line having a first wire and a second wire and having terminating resistors connected at ends of the two-wire communications line;
   a plurality of communications devices connected to the two-wire communications line to conduct communication, wherein each of at least a given part of the communications devices has a standby resistor which can be a terminating resistor of the two-wire communications line; and communication restoring means for
  locating a failed point of the two-wire communications line when the first wire breaks down, and
  determining, depending directly on a position of the located failed point, to select one of (i) a low-speed communication mode and (ii) a high-speed communication mode,
  the low-speed communication mode enabling all the communications devices to conduct communication at a lower speed by using only the second wire of the two-wire communications line,
  the high-speed communication mode enabling only a certain part of the communications devices to conduct communication at a higher speed by connecting, as one of the terminating resistors of the two-wire communications line, a standby resistor of a given communications device, included in the at least a given part of the communications devices and connected to the two-wire communications line near the failed point,
  wherein the given communications device is included in the enabled certain part of the communications devices which are all located on a same side of the two-wire communications line, when viewed from the failed point.

2. A communications system according to claim 1 wherein:
  the plurality of communications devices are control devices for controlling parts of an automobile,
  a critical communications device included in the communications devices is required to conduct communication so as to make the automobile run, and
  in a case where the located failed point is a fatal point that disables the critical communications device from conducting high-speed communication, the communication restoring means determines to select the low-speed communication mode that enables all the communications devices to conduct communication at the lower speed.

3. A communications system according to claim 2, wherein the critical communications device is connected nearer to one end of the two-wire communications line than other of said communications devices.

4. A communications system according to claim 1 wherein:
  in a case where all the communications devices conduct low-speed communication, at least one of the communications devices decreases at least one of (i) number of times for transmitting data and (ii) an amount of data to be transmitted.

5. A communications system according to claim 1 wherein:
  a certain communications device, included in the certain part of the communications devices that are enabled to conduct communication by the communication restoring means, performs processing, after a break failure occurs, by using a value of information stored in the certain communications device instead of a value of information that the certain communications device is supposed to receive from a predetermined communications device, included in the communications device but not included in the certain part of the communications devices that are enabled to conduct the communication by the communication restoring means.

6. A method for switching communication speed in a communications system including (i) a two-wire communications line having a first wire and a second wire and having terminating resistors connected at ends of the two-wire communications line and (ii) a plurality of communications devices connected to the two-wire communications line to conduct communication, wherein each of at least a given part of the communications devices has a standby resistor, which can be one of the terminating resistors of the two-wire communications line, the method comprising:
  locating a failed point of the two-wire communications line when the first wire breaks down,
  determining, depending directly on a position of the located failed point, to select one of (i) a low-speed communication mode and (ii) a high-speed communication mode,
  the low-speed communication mode enabling all the communications devices to conduct communication at a lower speed by using only the second wire of the two-wire communications line,
  the high-speed communication mode enabling only a certain part of the communications devices to conduct communication at a higher speed by connecting, as one of the terminating resistors of the two-wire communications line, a standby resistor of a given communications device included in the at least a given part of the communications devices and connected to the two-wire communications line near the failed point,
  wherein the given communications device is included in the enabled certain part of the communications devices which are all located on a same side of the two-wire communications line, when viewed from the failed point.

7. A method of claim 6 wherein:
  the plurality of communications devices are control devices for controlling parts of an automobile,
  a critical communications device included in the communications devices is required to conduct communication so as to make the automobile run, and
  in a case where the located failed point is a fatal point that disables the critical communications device from conducting high-speed communication, the low-speed communication mode that enables all the communications devices to conduct communication at the lower speed is determined to be selected.

8. A method for automatically restoring communication between at least some of plural communication devices disposed along and interconnected in parallel between two conductors that are resistively interconnected at each end for a maximum communication speed using both conductors, said method comprising, at each of said devices:
  monitoring for and detecting a fault point on one of said conductors;
  if a fault point is detected, automatically determining, depending on a position of the detected fault point, whether to (i) continue communicating at a slower speed using only one of said conductors or (ii) continue communicating at the maximum speed with a subset of other communication devices using both said conductors on one side of the detected fault point; and
  if option (ii) is determined automatically effecting a new resistive interconnection between said conductors at the communication device in said subset nearest the detected fault point.

9. A communications system provided in a vehicle, the system comprising:
  a two-wire communications line having a first wire and a second wire and having terminating resistors connected at ends of the two-wire communications line;

a plurality of communications devices connected to the two-wire communications line to conduct communication, wherein each of at least a given part of the communications devices has a standby resistor which can be a terminating resistor of the two-wire communications line, wherein the plurality of communications devices include at least two critical communications devices, each critical communications device being required to conduct communication so as to cause the vehicle to run for evacuation; and communication restoring means for
  locating a failed point of the two-wire communications line when the first wire breaks down, and
  determining, based on the located failed point, a selection of one of (i) a low-speed communication mode and (ii) a high-speed communication mode,
  the low-speed communications mode enabling all the communications devices to conduct communication at a lower speed by using only the second wire of the two-wire communications line,
  the high-speed communications mode enabling only a certain part of the communications devices to conduct communication at a higher speed by connecting, as one of the terminating resistors of the two-wire communications line, a standby resistor of a given communications device, included in the at least a given part of the communications devices and connected to the two-wire communications line near the failed point, wherein the given communications device is included in the certain part of the communications devices which are all located on a same side of the two-wire communications line, when viewed from the failed point, wherein when the located failed point is a fatal point that disables the critical communications devices from conducting high-speed communication therebetween, the communication restoring means determines a selection of the low-speed communication mode;

the at least two critical communications devices required to conduct communication so as to cause the vehicle to run for evacuation are an engine electronic control unit (ECU) and a transmission ECU; and when the located failed point is between the engine ECU and the transmission ECU, the communication restoring means determines a selection of the low-speed communication mode.

10. A communications system according to claim 9, wherein at least one of the critical communications devices is connected nearer to one end of the two-wire communications line than other of said communications devices.

11. A communications system according to claim 9, wherein:

in a case where all the communications devices conduct low-speed communication, at least one of the communications devices decreases at least one of (i) number of times for transmitting data and (ii) an amount of data to be transmitted.

12. A communications system according to claim 9, wherein:

a certain communications device, included in the certain part of the communications devices that are enabled to conduct communication by the communication restoring means, performs processing, after a break failure occurs, by using a value of information stored in the certain communications device instead of a value of information that the certain communications device is supposed to receive from a predetermined communications device, included in the communications device but not included in the certain part of the communications devices that are enabled to conduct the communication by the communication restoring means.

* * * * *